Dec. 12, 1933.  R. J. MILLER  1,938,853
AEROPLANE PARACHUTE RELEASING MEANS
Filed April 4, 1931
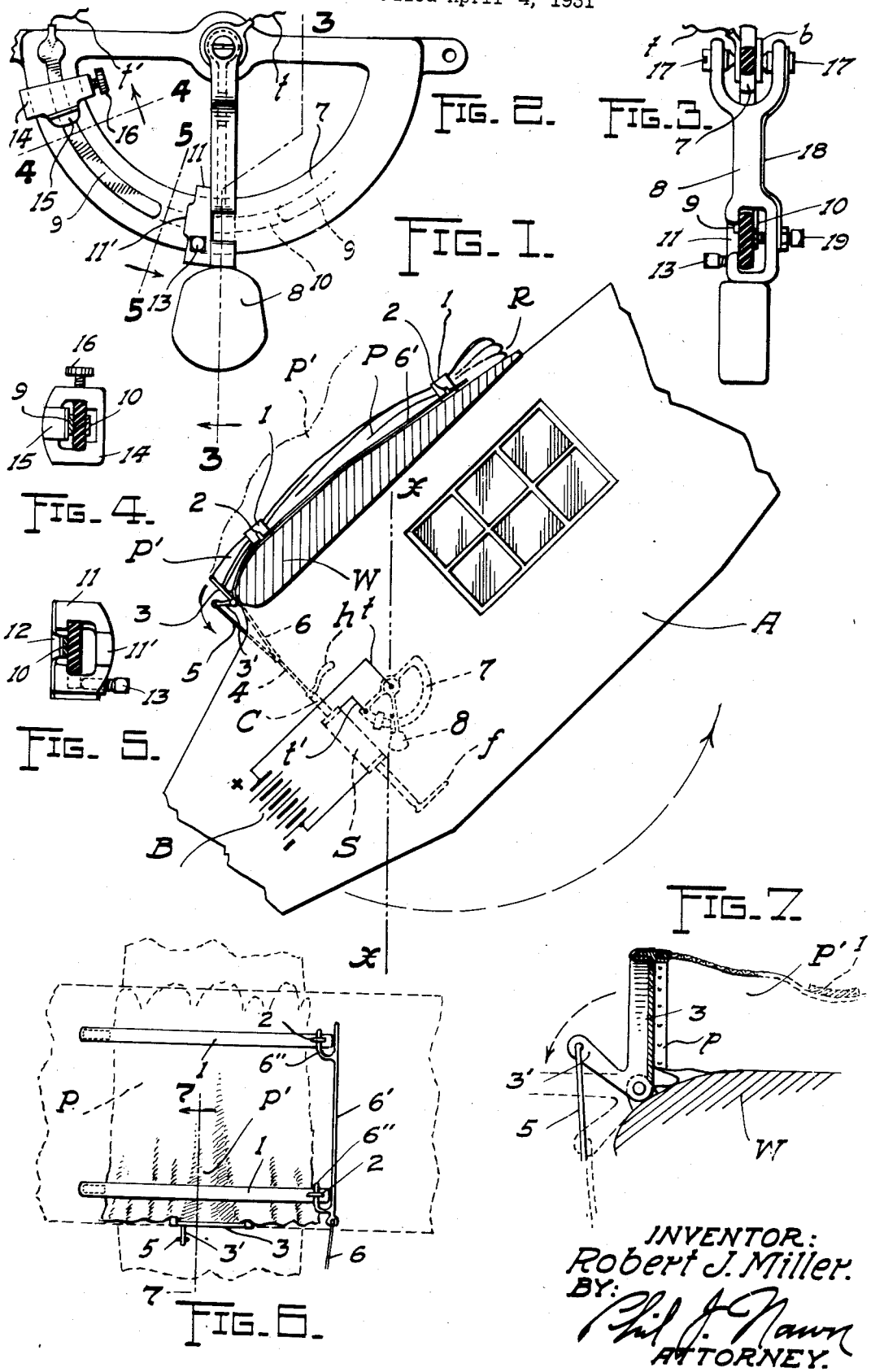
INVENTOR:
Robert J. Miller.
BY:
ATTORNEY.

Patented Dec. 12, 1933

1,938,853

UNITED STATES PATENT OFFICE 1,938,853

AEROPLANE PARACHUTE RELEASING MEANS

Robert J. Miller, Milwaukee, Wis.

Application April 4, 1931. Serial No. 527,658

2 Claims. (Cl. 244—21)

This invention relates to aeroplanes, or like flying machines, and the adoption of parachute attachments for safeguarding their descent.

The objects of the invention are:—

The providing of automatic parachute releasing means, which will function without manual assistance or with manual assistance.

The providing of an electric circuit that is effective for impulsing a releasing mechanism which binds a parachute to an aerial body when said body reaches a determined angle of inclination.

The providing of electrically or manually controlled means that will function for releasing a parachute at an angle of inclination determinedly selected beforehand.

The offering of means whereby the air currents encountered by a flying machine will be enlisted for assisting a parachute to unfold into its weight-sustaining aspect.

Other advantages will be noted throughout the particular description, and specifically pointed out in the appended claims, both sections of this application referring to the accompanying drawing illustrating the invention.

The disclosure seen in the drawing is largely diagrammatic, and intentionally so. Well-known equivalents for equipments shown are equally adaptable with such variations as the particular functioning of the assembly here employed may require.

The drawing is indexed as follows:—

Fig. 1 is a fragmentary view of an aeroplane, showing the invention as applied, and just prior to the opening of the parachute.

Fig. 2 is an enlarged view of a pendulum switch employed in the invention.

Fig. 3 is a section on line 3—3 of Fig. 2.

Fig. 4 is a section on line 4—4 of Fig. 2.

Fig. 5 is a section on line 5—5 of Fig. 2.

Fig. 6 is a fragmentary top-plan view of Fig. 1.

Fig. 7 is an enlarged section on line 7—7 of Fig. 6.

Similar characters of reference apply to like parts throughout the several views.

Fig. 1 illustrates an aeroplane A tilting, with respect to a line X—X indicating the vertical, into what is termed a "nose-dive". When a more vertical angle is reached the parachute P will be released from its bound position on the wing W, or other suitable location dependent upon the design of flying machine so equipped, when said parachute will inflate and lend its weight-supporting faculty for retarding descent of the body to which it is attached. The precise means of attaching the parachute has not been considered here due to the variations of "rigging" concepts and the design of aeroplane concerned, any suitable means for attaching the parachute P is assumed in the present instance, which will allow the said parachute to be folded compactly, as indicated. The attachment is held by straps 1 which are locked, as are hasps, over staples 2 attached to the wing W. At the center of the folded parachute is arranged a purposeful billow P'. This is attained by employing a metallic, or similar edging, p. This edging is shaped to hold the border of the parachute in arched formation, offering a suitable element which will cooperate with a door closure 3 which is hinged to the wing W independently of the parachute P. The said door is normally closed, but, when open the wind rushes into the tunnel P', after the straps 1 have been released, and initiates the inflation of the parachute aforesaid; the opening of the said door, and the releasing of the straps 1, as will be explained presently, occur simultaneously.

An electric solenoid S, when energized, will attract its core C so as to produce a pull on a cable 4 attached to said core. The cable 4 is divided, one branch 5 of the bifurcation being attached to a lever 3', integral with the door 3, and the other branch 6 attaching to a rod 6' shaped to conform to the surface of the wing W, the latter offering off-set hooks 6" which enter the staples 2 for binding the parachute P with the straps 1. A conveniently located segment 7 is provided with a pendulum member 8, the latter is sensitively pivoted to traverse said segment in response to the aeroplane's inclination in order to close an electric circuit here adopted whose "gap" occurs between the terminals $t$ and $t'$, respectively leading from the positive and negative outlets of an electric power source, such as a battery B. One-half of the segment 7 is shown developed, but it will be understood that the other half will be arranged similarly, because, the opposite inclination of a nose-dive, is intended to be guarded against as well. However, in the latter instance there will be no need for a wind tunnel P'; the folds of the parachute P lend themselves readily for admitting air-currents at R that will produce a raising of the said parachute initially. In this last mentioned phase the pendulum 8 will traverse the segment's opposite quadrant, with the same result as before described so far as the pendulum's circuit-closing is concerned.

The segment 7 may be graduated to indicate the degrees of inclination at which the operating mechanism will become effective. The segment 7 and the pendulum 8 are, in the present disclosure, constructed of non-conductive product which offers a current-conducting strip 9 upon its outer face, and a similar strip 10 along its inner surface. A slidable block 11 envelopes the segment 7 and carries current obtained through contact with a similar block 14 locatable along the said segment. The block 11 has an abutting face 11' which makes contact with the block 14 free of the strip 9. The opposite side of block 11 has an integrally attached wiper 12 which contacts with the strip 10. The said block is provided with a set-screw 13 by which it may be fixed to the segment 7 thereby locking the pendulum 8 against movement during such occasions as obtain in "stunt" flying. The block 14 carries a wiper 15 which contacts with the strip 9, the latter being in connection with the negative terminal $t'$, the said block 14 can be adjusted and held to any of the graduated positions on the segment 7 by means of a set-screw 16. It will be noticed that the block 14 does not contact with strip 10.

The pendulum 8 is delicately pivoted to a bushing $b$, which latter is connected to the positive battery outlet by the wire $t$; coned screws 17 provide the necessary pivot, and from the inner screw there extends a current-conducting strip 18 which terminates at an adjusting-screw 19 that determines the frictional contact requisite between said screw and the strip 10. The current-gap, between $t$ and $t'$, it will be noticed, is closed by the electrical connection set up by the swinging of the pendulum 8 which carries with it the block 11; the latter being interposed between the said pendulum 8 and the block 14 for eliminating the possibility of a rebound in the pendulum upon striking the block 14 and leaving same before the mechanism affected has fully responded; block 11 will remain in contact, when the current will be transmitted across the aforesaid gap in the manner obviously set forth.

The foregoing refers to the operation of the invention as regards the automatic phase, however the mechanism may be affected manually where the operator's presense of mind is retained. This is accomplished by either pulling down the handle $h$, or depressing the pedal $f$, both of which, along with the other essentials, should be located at advantageously convenient positions.

The closure 3, in Figs. 1 and 7, show the door as opening outwardly, however, this closure may be arranged to open inwardly, or, further, this closure could be designed with a flexible edge 3', held flat as a closure and released to spring into the shape which would offer a suitable aperture for admitting air as does the arrangement described above.

Having described the invention, what is claimed and desirous of protecting by United States Letters Patent is:—

1. An aeroplane having, a parachute attachment, a pendulum arm, a current carrying segment, said arm swingable about said segment, an electrical circuit closing block slidable before said pendulum upon said segment, a terminal block locatable on said segment, said arm affected by the inclination of said aeroplane to force said closing block to co-act with said terminal block for completing an electrical circuit, and a mechanism affected by the aforesaid circuit for releasing the said parachute to function as a detent retarding the descent of the aforesaid aeroplane.

2. An aeroplane having, a releasable parachute attached thereto, plural means locking said parachute at spaced intervals for retaining said parachute inoperatively, an air tunnel provision furnished with a closure and outlined by the framework of said closure, a singular rod offering hooks coactive for locking at the said spaced intervals, a bifurcated connection servicing said closure means and said plural means, and an electrically energized reciprocative member affected by the inclination of the aforesaid aeroplane and affected by manual force for simultaneously opening said closure means and unhasping the said plural means by the exerting of a singular pulling action on the bifurcated connection attached to said rod.

ROBERT J. MILLER.